(12) United States Patent
Lee (10) Patent No.: US 6,903,656 B1
(45) Date of Patent: Jun. 7, 2005

(54) RFID READER WITH MULTIPLE ANTENNA SELECTION AND AUTOMATED ANTENNA MATCHING

(75) Inventor: Donny V. Lee, Northport, NY (US)

(73) Assignee: Applied Wireless Identifications Group, Inc., Monsey, NY (US)

( * ) Notice: Subject to any disclaimer, the term of this patent is extended or adjusted under 35 U.S.C. 154(b) by 70 days.

(21) Appl. No.: 10/445,159

(22) Filed: May 27, 2003

(51) Int. Cl.⁷ ............................................. G08B 13/14
(52) U.S. Cl. ............................ 340/572.1; 340/572.2; 340/10.1
(58) Field of Search .................. 340/572.1, 572.2, 340/572.4, 572.7, 10.1, 10.3; 343/745

(56) References Cited

U.S. PATENT DOCUMENTS

| | | | |
|---|---|---|---|
| 4,471,344 A | * | 9/1984 | Williams .................. 340/572.2 |
| 5,450,492 A | * | 9/1995 | Hook et al. ..................... 380/28 |
| 5,519,381 A | | 5/1996 | Marsh et al. |
| 5,521,601 A | | 5/1996 | Kandlur et al. |
| 6,028,564 A | * | 2/2000 | Duan et al. .................. 343/818 |
| 6,317,027 B1 | * | 11/2001 | Watkins ...................... 340/10.1 |
| 6,362,737 B1 | | 3/2002 | Rodgers et al. |
| 6,392,544 B1 | | 5/2002 | Collins et al. |
| 6,396,438 B1 | | 5/2002 | Seal |
| 6,509,836 B1 | | 1/2003 | Ingram |
| 6,535,175 B2 | * | 3/2003 | Brady et al. ................. 343/795 |
| 6,681,990 B2 | * | 1/2004 | Vogler et al. ............... 235/385 |

* cited by examiner

*Primary Examiner*—John Tweel, Jr.
(74) *Attorney, Agent, or Firm*—Mark Levy & Associates; David L. Banner (57) ABSTRACT

The present invention features an RFID smart shelf reader capable of working with a wide range of antenna types and numbers. The smart shelf reader readily accommodates and accurately reads a diverse range of package shapes, sizes, and contents. Multiple tags in close proximity to one another are accurately read by the smart shelf reader. The reader includes features for optimizing its own interface by periodically recalibrating itself to the current antenna load characteristics caused by varying external conditions, primarily in the type, number, and position of merchandise items on the shelf proximate at least one of the antennas. An external I/O interface is provided for communication with a remote controller.

12 Claims, 6 Drawing Sheets

Figure 1

Prior Art

Figure 4C

RFID READER WITH MULTIPLE ANTENNA SELECTION AND AUTOMATED ANTENNA MATCHING

BACKGROUND OF THE INVENTION

Smart shelf readers represent an emerging technology wherein articles of merchandise presented for sale in a retail establishment are each equipped with a radio frequency identification (RFID) transponder, or "tag" as the transponders are known in the art. These smart shelf readers are capable of determining the number, identity, and location of multiple tagged merchandise items placed on a store shelf, book shelf, or other display fixture. When these shelves or other fixtures are equipped with one or more antennas coupled to an RFID interrogator, the contents of each merchandise item's tag may be read by the RFID interrogator. By reading the tags on the merchandise items, store management can obtain a wealth of information.

First, the count and/or location of each inventory item may be obtained and, consequently, out of stock situations may be avoided. Keeping shelves stocked with product no longer depends on an employee's periodic visual scanning of shelves and initiation of a restocking activity since a computer inventory control system coupled to the smart shelf system can intelligently initiate restocking. Reordering of products may also be handled semi- or fully automatically based upon information from the smart shelf system.

Misplaced items (e.g., items picked up by a shopper and later randomly set down at a location in the store other than where the item belongs) may be readily located and included, if desired, in the real-time inventory.

Smart shelf systems may also provide easy and/or early detection of pilferage.

Shopper preference information may be readily obtained by recording the number of times a particular product is picked up and then re-shelved by a shopper. Real time information about product placement may also be obtained. That is, a product's shelf location may be changed and the effect noted in a matter of hours or days rather than at the end of a sales quarter or other relatively long time.

Smart shelf RFID systems of the prior art are subject to several limitations. First, because of the way RFID systems operate, the merchandise itself presents limitations. Package sizes, shapes, and contents vary considerably. Each of these factors presents design challenges. In the past, liquids in the packages have presented particularly difficult obstacles to implementing RFID-based smart shelf systems. Because RFID systems rely on the radio frequency (RF) absorption characteristics of the packages and their contents, liquids often provide very different characteristics from solids or powders. In addition, product spillage, acts of sabotage, and other abuse or neglect of the equipment may impair the ability of an RFID smart shelf system to be kept at peak operating efficiency.

When smart shelf readers are placed in commercial installations, there are several parameters that must be considered. Smart shelf readers are generally used with an array of antennas, typically positioned close to one another.

Often, the tagged merchandise items to be tracked are placed directly on top of these antennas with only a very small gap separating the antennas and the items. Because smart shelf systems are typically designed for general merchandise tracking and monitoring, the interaction between the radiated RF wave and the merchandise must be carefully considered.

Since different packaging can have different RF absorption or reflection characteristics, the type of packaging and the material within the packaging, plus the number of packages on the antenna, will affect the antenna matching. In order to achieve optimum interface in such dynamic and changing environments, the smart shelf readers must be designed to accommodate wide ranges of conditions while maintaining peak circuit interface.

DISCUSSION OF THE RELATED ART

U.S. Pat. No. 5,519,381, issued May 21, 1996 to Michael J. C. Marsh et al. for DETECTION OF MULTIPLE ARTICLES teaches a design requiring at least two spaced-apart transmitting antennas and at least two spaced-apart receiving antennas. The Marsh et al. preferred embodiment is a system with multiple transmitting and receiving antennas simultaneously operating to achieve multiple article reading. This is a concept far different from what is described by the present invention.

The idea of using a narrow band interrogator is simple, but the idea of using a wideband transponder is difficult to achieve, especially when considering the wide variety of mounting surfaces for the transponders. For example, a tag that is designed to be mounted on a metallic object must fight between the conflict requirements of a thin tag and wide bandwidth. When operating in the ISM band, separation in frequency is random and cannot be relied on. The statement "These frequencies are chosen so that there is no location within the interrogation zone where there is an RF null at both frequencies" is easy to make but difficult to achieve in practice. When operating in the ISM band, typically 902 to 928 MHz, with a random frequency separation, such absence of null is virtually impossible to establish. These problems are overcome in the designs of the present invention.

U.S. Pat. No. 5,521,601, issued to Dilip D. Kandlur et al. on May 28, 1996 for POWER EFFICIENT TECHNIQUE FOR MULTIPLE TAG DISCRIMINATION also deals with tags and not with interrogators. KANDLUR et al. teach a method of transponder design, or more specifically, the internal operating logic of the transponders. The interrogator powers all tags, and if many tags are on and operating at the same time, there will be many transponders, each absorbing 30 to 50 microwatts. For a large number of tags, that absorption is very large, causing some outlaying transponders to become starved of energy. The design of the present invention deals with the problem of activating multiple antennas. In essence, the same result is achieved through interrogator manipulation, not through transponder manipulation.

U.S. Pat. No. 6,362,737, issued to James L. Rodgers et al. on Mar. 6, 2002 for OBJECT IDENTIFICATION SYSTEM WITH ADAPTIVE TRANSCEIVERS AND METHODS OF OPERATION teaches a system that uses a deterministic method of frequency selection to communicate between interrogators and transponders. The second transmission frequency selection process appears to be in conflict with the basic Federal Communications Commission (FCC) requirements of ISM band operation where the frequency selection in the ISM band must operate in a pseudo random fashion. In contradistinction, the approach in the inventive design relies on an anti-collision algorithm to resolve a multi-tag transmission scenario. Unlike Rodgers et al., the inventive design uses existing transponders and manipulates the output power of the interrogator to achieve cross channel ambiguities.

U.S. Pat No. 6,392,544, issued on May 21, 2002 to Timothy James Collins et al. for METHOD AND APPARATUS FOR SELECTIVELY ACTIVATING RADIO FREQUENCY IDENTIFICATION TAGS THAT ARE IN CLOSE PROXIMITY teaches a system similar to that of the present invention. Both the Collins et al. system and that of the present invention use a plurality of antenna elements that are spaced to define active areas and a matrix switch to flexibly connect the plurality of antenna elements to an exciter circuit. However, the Collins et al. system, unlike that of the present invention, attempts to use at least two antenna elements to establish an electric field. In addition, an attempt is made to send out different commands to non-selected areas to de-activate the transponders in those areas.

In the instant invention, a single antenna is used to define the active zone. Power manipulation is used to attenuate signals at the fringe of the active zone. Antennas are switch selected only one at a time, rather than two at a time as in the Collins et al. system. In addition, no activate and disable commands are issued. Instead of toying with activating and de-activating the tags to manage the task of energizing a large number of tags in the same field, the energy absorption problem is left to continued progress in the semiconductor industry.

U.S. Pat. No. 6,396,438, issued to James Seal on May 28, 2002 for SYSTEM AND METHOD FOR LOCATING RADIO FREQUENCY IDENTIFICATION TAGS USING THREE PHASE ANTENNA teaches a system including a plurality of stationary antennas arranged in unique physical orientations and capable of transmitting radio frequency signals of differing phases. The SEAL transponder is equipped to receive the plurality of signals and is able to compare the phase of at least two of the signals to determine the relative position of a particular transponder. Another feature of the SEAL system is the ability of the transponder to determine the strength of the signal received as a means to further determine the location of the transponder.

U.S. Pat. No. 6,509,836, issued to Mary A. Ingram on Jan. 21, 2003 for SMART REFLECTION ANTENNA SYSTEM AND METHOD teaches a system that requires at least two transmitting antennas configured to transmit the same carrier signal. The Ingram system also includes an interrogator receiver array of at least two receiving antennas. One of the potential problems with this design is if both antennas are driven from a single source, there will be an RF null within the field of the antenna zone. If the two antenna are driven from two different RF sources, there is still the possibility of random nulling at unpredictable intervals. This makes it difficult to achieve reliable system operation. These problems are overcome in the design of the present invention.

SUMMARY OF THE INVENTION

In accordance with the present invention, there is provided an RFID smart shelf reader capable of working with a wide range of antenna types and numbers. The smart shelf reader readily accommodates and accurately reads a diverse range of package shapes, sizes, and contents. Multiple tags in close proximity to one another are accurately read by the smart shelf reader. The reader includes features for optimizing its own interface by periodically recalibrating itself to the current antenna load characteristics caused by varying external conditions, primarily in the type, number, and position of merchandise items on the shelf proximate at least one of the antennas.

It is therefore an object of the invention to provide an RFID smart shelf system capable of supporting a wide range of antenna types, shapes, sizes, and numbers.

It is another object of the invention to provide an RFID smart shelf system capable of periodically recalibrating (i.e., adjusting antenna matching or loading) itself to maintain optimum antenna matching regardless of the external environment.

It is a further object of the invention to provide an RFID smart shelf system which can accurately read multiple tags in close proximity to an antenna.

It is yet another object of the invention to provide an RFID smart shelf system which can accurately read multiple tags and arbitrate when collisions occur in reading multiple tags.

It is an additional object of the invention to provide an RFID smart shelf system that utilizes an array of antennas which may be selectively switched by the RFID reader.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

Figure 1:
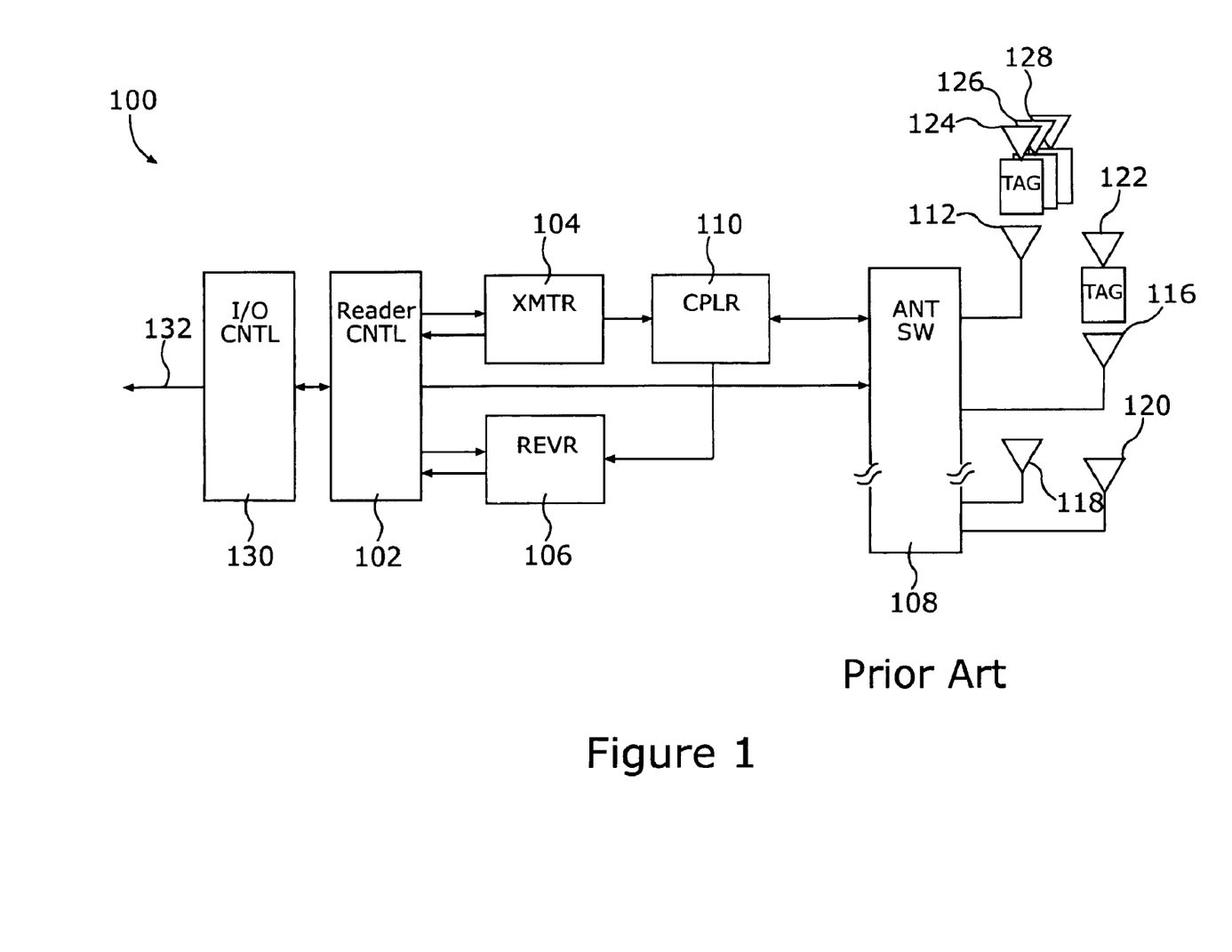
FIG. 1 is a schematic block diagram of an RFID reader of the prior art.

Referring to FIG. 1, there is shown a schematic block diagram of the an RFID smart shelf reader of the prior art, generally at reference number 100. The term smart shelf reader is used herein to refer to an RFID interrogator having at least a transmitter, a receiver, and a controller. The reader controller 102 is connected to a transmitter 104, receiver 106, and antenna switch 108. A coupler 110 is connected to the transmitter 104, receiver 106, and antenna switch 108. The antenna switch 108 is connected to a plurality of antennas 112, 116, 118, 120. While four antennas are shown for purposes of disclosure, it will be recognized by those of skill in the art that many more antennas could be used. The coupler 110 is sometimes called a circulator or directional coupler. These types of devices are well known to those skilled in the high frequency RF design arts and will not be further explained herein. A plurality of RFID tags 122, 124, 126, 128 are shown, tag 122 being close to the antenna 116. Each RFID tag 122 128 contains a code, generally in smart shelf applications related to a specific product identity, typically related to a universal stock keeping unit (SKU) code.

The reader controller 102 is connected to the I/O interface 130. The I/O interface 130 is connected to an external controller (not shown) by a bus 132, intending to represent a variety of interconnection topologies, including, but not limited to: a local area network (LAN), dedicated networks, or any other interconnection method suitable for bi-directionally transferring commands and data between the I/O interface 130 and the external controller. The specific interconnection method forms no part of the invention.

In operation, a command to read the ID of a specific tag ID or group of tags is issued, either externally from an external controller (not shown) or internally. The tag ID could, of course., consist of an SKU or similar code. The reader controller 102 can operate either autonomously or under the control of the external controller. Regardless of the command's origin, the reader controller 102 formulates the necessary command sequence to be sent to the tag(s) matching the desired code. The tags 122–128 typically contain a rudimentary processor (not shown) and memory that is often reprogrammable. RFID tags are well known to those of skill in the art and will not be further described herein.

The memory in the RFID tags 122–128 will typically have been preprogrammed with a code to which the tag is expected to respond. This code is stored within the tag's internal memory (not shown). The command may include information as to the tag ID(s) of the tags which are expected to respond, instruction to the tag's processor, or new data to be stored in the tag's memory.

The transmitter 104 generates an RF signal which is directed through a coupler 110 to an antenna selection switch 108. The reader controller 102 will have determined which antenna 112–120 is to be connected to the transmitter 104 (via a coupler 110) and upon command from the reader controller 102, the antenna switch 108 makes the necessary electrical connection to the desired antenna 112–120. Typically, multiple antennas 112–120 will be sequentially connected to the transmitter 104, the sequence being determined and controlled by the reader controller 102. The transmitter 104 first transmits a non-modulated, continuous wave (CW) signal to power-up all tags 122–128 within range of one of the antennas 112–120. The CW transmission must be long enough to ensure that the RFID tags 122–128 have received sufficient signal to energize themselves and are therefore enabled to receive and decode a command query and respond thereto. Next, the transmitter 104 generates an amplitude modulated (AM) signal, the necessary modulator (not shown) is included within transmitter 104. The modulated signal contains the command sequence formulated by the reader controller 102.

After the AM command signal has been transmitted for a predetermined length of time and to a predetermined sequence of antennas 112–120, the RF signal is changed again to a CW signal. This CW signal is used both to provide necessary operating power to the tags 122–128 and to allow backscattering of the signal by one or more of the selected tags 122–128. The backscattering process forming the operational backbone of many RFID identification systems is also well known to those of skill in the art and will not be further described herein.

For example, when antenna 112 is activated, the RFID tags 124, 126, 128 shown near antenna 112 receive RF energy from the antenna. In addition, antenna 112 receives backscattered RF energy from tags 124, 126, 128. This received, backscattered RF energy is passed from antenna 112 through the antenna selection switch 108 and to the coupler 110. The coupler 110 directs the received energy to the receiver 106 where the received signal is decoded. The receiver 106 typically contains signal processing capability (not shown) to aid in the decoding process. Raw tag ID and other tag data are sent from the receiver 106 to the reader controller 102. The raw data is further decoded and processed at the reader controller 102 before being passed to the I/O interface 130 and, subsequently, sent via bus 132 to a remote data controller (not shown) attached thereto.

In the above example, the backscattered signal from the tags 124, 126, 128 may reflect to the antenna 112 and subsequently to the receiver 106 at the same time causing a condition known as data collision. When data collision is detected, the reader 106 sends a signal to the reader controller 102 indicating that data collision has occurred. The reader controller 102 then shifts into anti-collision mode and arbitrates the received data. This is accomplished by originating a sequence of arbitrating commands. The exact sequence and mode of such commands depends on the air interface protocol used for such tags. Arbitration schemes are known in the art and the exact arbitration scheme used forms no part of the instant invention. This anti-collision arbitration process allows the smart shelf reader to read multiple tags within the range of each antenna. One common arbitration scheme is "tag talk first" (TTF). In TTF, every tag transmits its ID or data at random time intervals and/or in random/pre-assigned time slots, allowing transmitter 104 to send a CW signal and the reader 106 is placed in a continuous listening mode. By switching to selected antennas 112–120, a smart shelf reader 200 can read hundreds of tags on the shelf and clearly identify which group of tags is associated with which antenna 112–120. In this manner, the location of specific tags may be ascertained.

Each item placed on the smart shelf presents a degree of loading on the antenna matching circuit. The load on any given antenna depends on the content, quantity, form factor, and the composition of the merchandise near the antenna. As the number of items or the nature of the items near the antennas change, the antennas may slowly drift away from an optimally matched condition. Because optimal matching is where the RFID reader reaches peak performance, as items are being added or being removed from the shelf, the reader performance may degrade. There are also times when careless customers may spill some liquid on the shelf antenna or otherwise cause other types of performance degradation. This may cause the reader to detune itself and, in worst case scenarios, the reading capability may be lost altogether.

Figure 2:
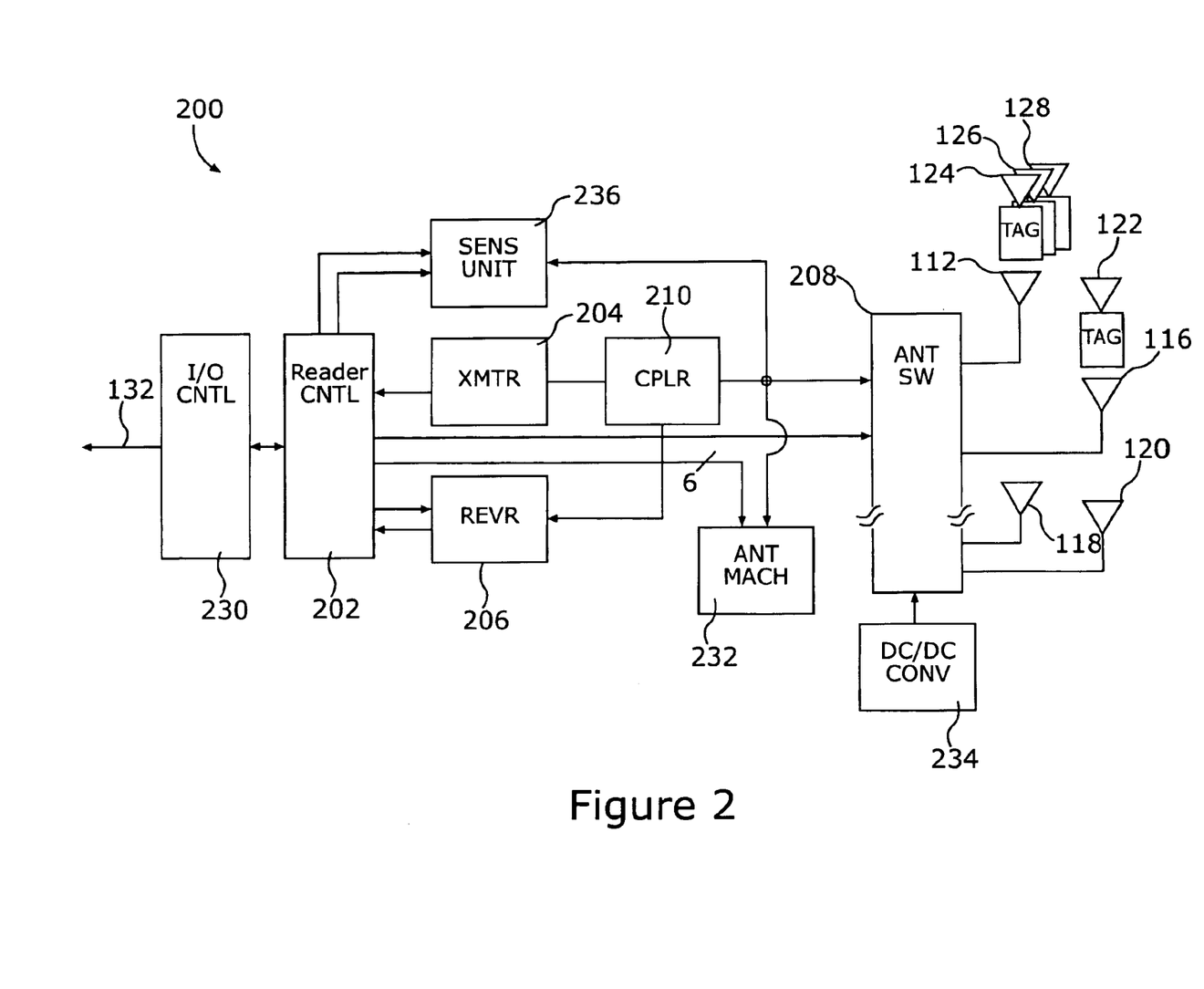
FIG. 2 is a schematic block diagram of an RFID reader in accordance with the present invention.

Referring now to FIG. 2, there is shown a schematic block diagram of the RFID smart shelf reader of the present invention, generally at reference number 200. The reader controller 202 is connected to a transmitter 204, receiver 206, and antenna switch 208. The transmitter 204 is able to generate (transmit) both a modulated and/or a continuous wave (CW) RF signal upon command from reader controller 202. A coupler 210 is connected to a transmitter 204, receiver 206, and antenna switch 208. The antenna switch 208 is connected to a plurality of antennas 112, 116, 118, 120. It will be recognized that antennas 112–120 are representative of a potentially large number of individual antennas and that the invention is not considered limited to the four antennas chosen for purposes of disclosure.

A plurality of RFID tags 122, 124, 126, 128 are shown, tag 122 being close to antenna 112. The reader controller 202 is connected to the I/O interface 230. The I/O interface 230 is connected to an external controller (not.shown) by bus 132. Bus 132 is intended to represent a variety of interconnection topologies, including, but not limited to: a local area network (LAN), dedicated networks, or any other interconnection method suitable for bi-directionally transferring commands and data between the I/O interface 230 and an external controller. The specific interconnection method forms no part of the instant invention.

Figure 4A:
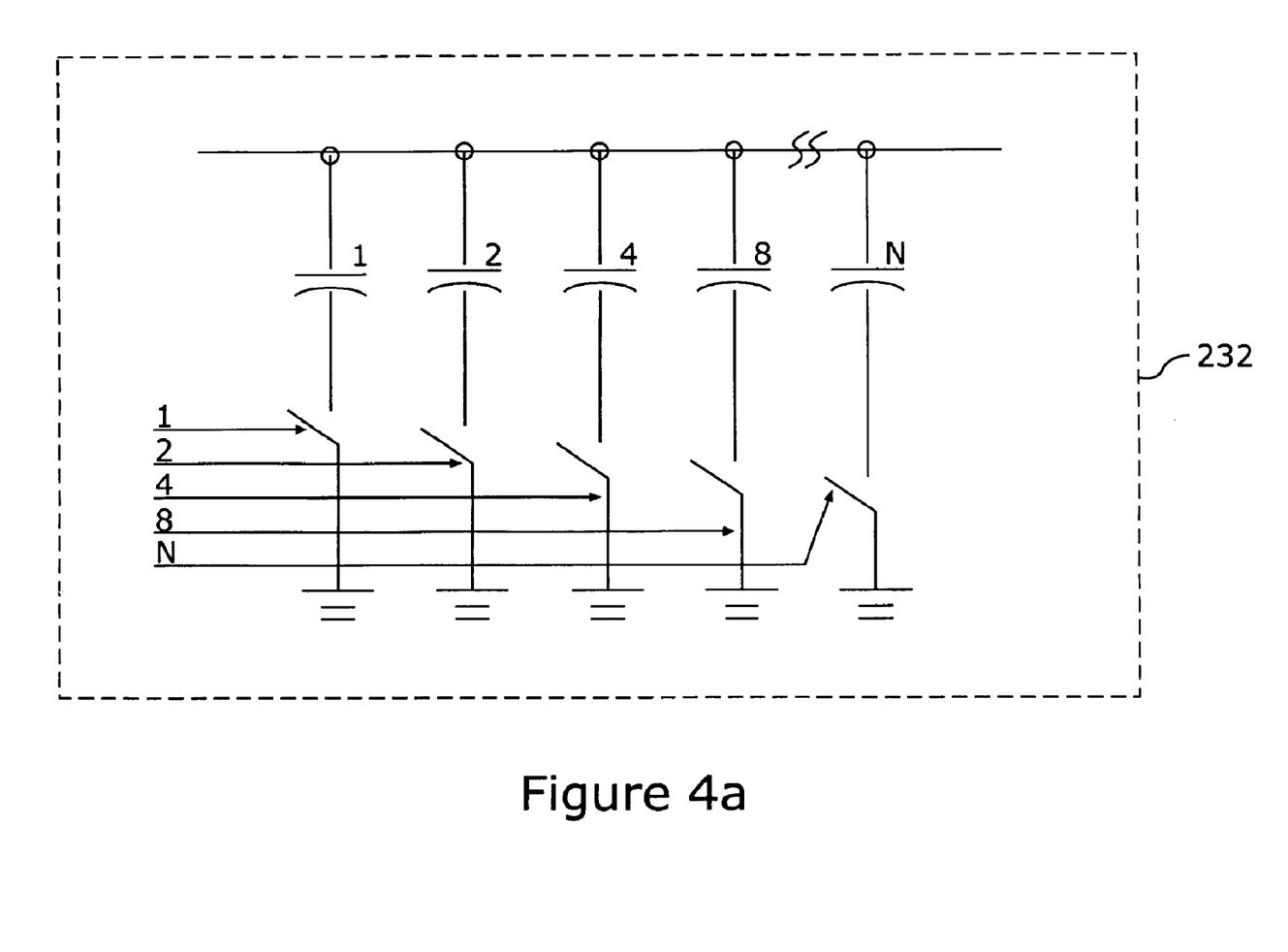
FIG. 4a is a detailed schematic view of a first embodiment of an antenna matching unit implemented as a switched capacitor bank and forming a part of the RFID reader of FIG. 2.
Figure 4B:
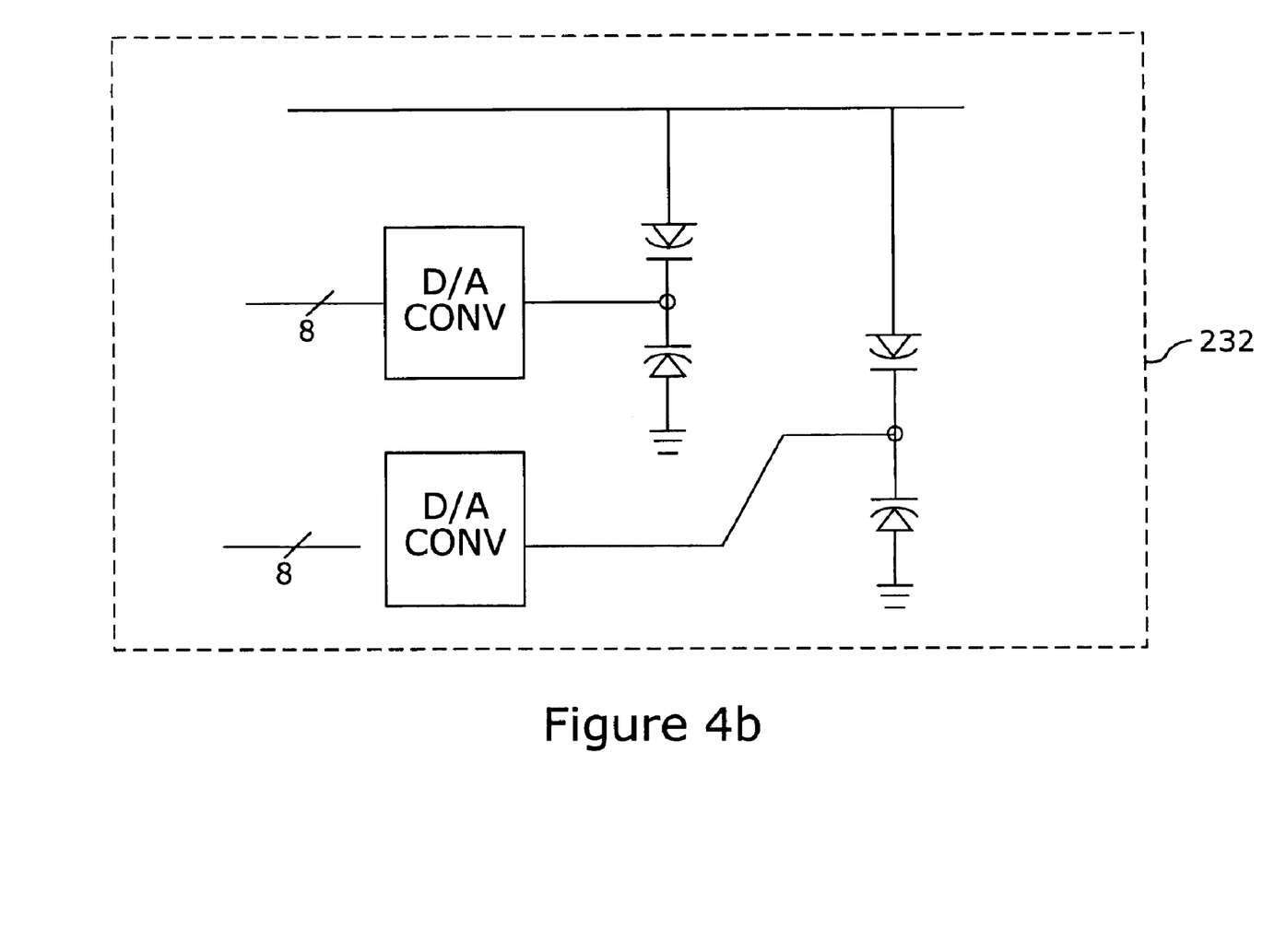
FIG. 4b is a detailed schematic view of a second embodiment of an antenna matching unit implemented as a varactor controlled matching unit and forming a part of the RFID reader of FIG. 2.
Figure 4C:
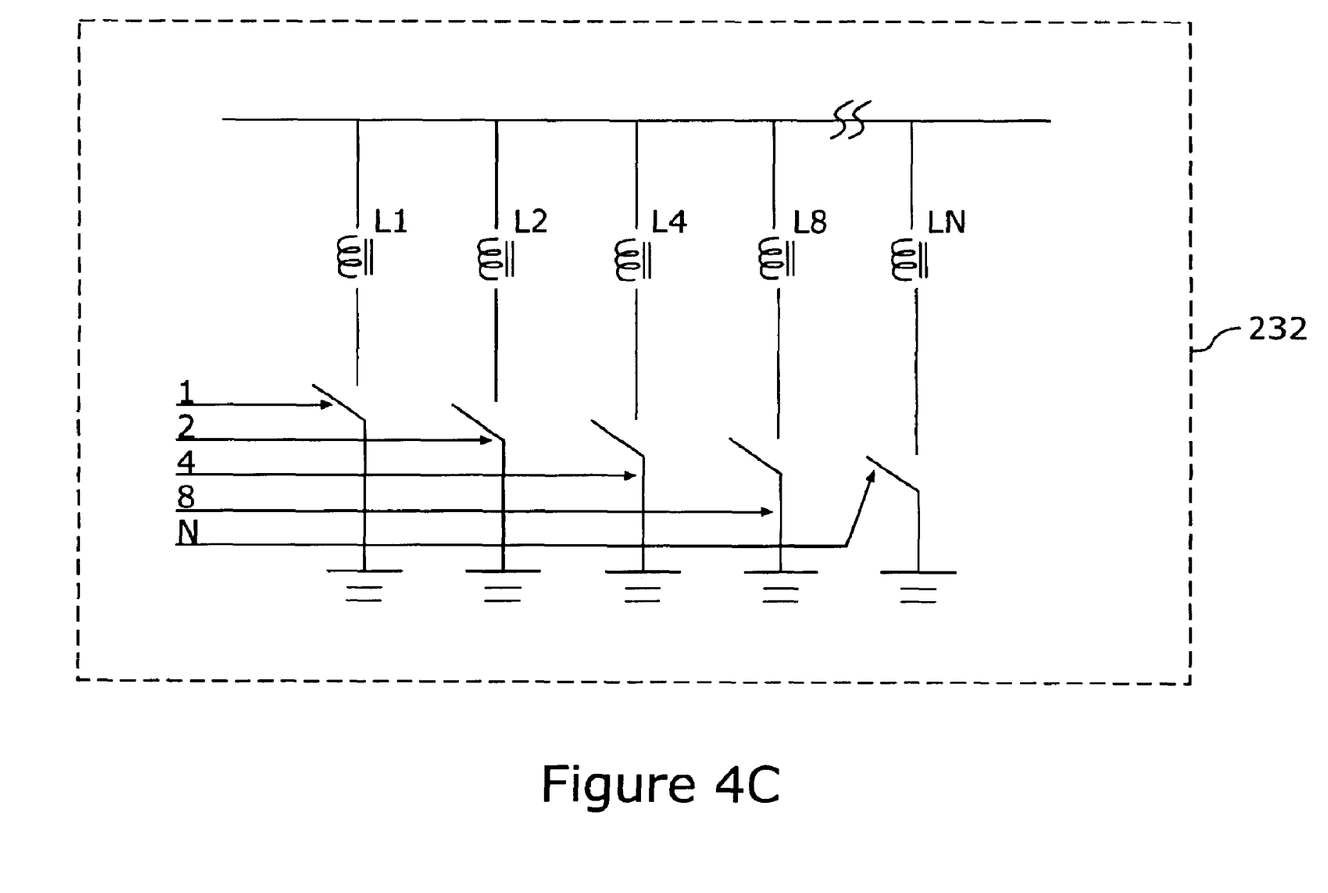
FIG. 4c is a detailed schematic view of a third embodiment of an antenna matching unit implemented as a switched inductor bank and forming a part of the RFID reader of FIG. 2.

A sensing unit 236 is bi-directionally connected to a reader controller 202 as well as to an antenna switch 208 and an antenna matching unit 232. The antenna matching unit 232 consists of a switchable capacitor bank (FIG. 4a), a switchable voltage controlled varactor array (FIG. 4b), or a switched inductor array (FIG. 4c). In alternate embodiments, combinations, not shown, of capacitors, inductors and/or varactors may be used. Any other means for presenting a selectable, switchable impedance to antenna switch 208 to optimize antenna matching (i.e., antenna loading) may also be used. The antenna matching unit 232 is also connected to the reader controller 202 and is adapted to receive commands therefrom to present a selectable impedance to the selected one of antennas 112–120 to optimally tune that one of antennas 112–120. This is accomplished by switching the reactive components or varactors located in the antenna matching unit 232.

A DC-to-DC converter 234 is connected to the antenna switch 208. This DC-to-DC converter is used to ensure proper biasing of the switching elements within the antenna switch 208, thereby ensuring optimum performance thereof.

Operation of the inventive RFID reader 200 is similar to that of the prior art RFID reader 100 (FIG. 1). However, the addition of a sensing unit 236 and the antenna matching unit 232 provides the ability to keep the antennas 112–120 properly matched (i.e., tuned) to the transmitter 204/coupler 210. The sensing unit 236 receives a signal from the antenna switch 208. From the quality of the signal, specifically parameters such as current drawn by the transmitter, peak RF voltage at the antenna switch 208, and the combination of both current and voltage, sensing unit 236 determines if the antenna is properly matched. In most cases peak antenna voltage is easier to measure than is current. Measuring peak antenna voltage is similar to seeking the peak of a bell curve. On the other hand, current sensing is usually more sluggish and less sensitive to tuning adjustments. Voltage sensing is, therefore, the preferred means for achieving antenna matching. It should be noted that current sensing will achieve the same degree of performance enhancement. The output from the sensing unit is a sensing command, which provides a signal to the reader controller 202. The reader controller 202 is able to evaluate data from the sensing unit 236 and issue appropriate commands to the antenna matching unit 232. For RF voltage sensing, the sensing unit 236 may be implemented as a half-wave peak voltage detector. As optimum antenna matching is approached, the voltage at the output of the peak detector also approaches a maximum. When the antenna de-tuning occurs, this voltage will start to decrease. Therefore, the sensing unit 232 must contain two voltage storage units, not shown, one for the voltage before the tuning adjustment and one for voltage after the voltage adjustment. If the voltage after the tuning adjustment is higher than the voltage before the tuning adjustment, the tuning process is correct and the tuning action should continue in that direction. When the voltage after the tuning adjustment is lower than the voltage before the tuning adjustment, that means the tuning action has overshot the optimum tuning point and the tuning adjustment should immediately stop. Such tuning adjustment is an iterative process, and can be implemented by either a continuous fixed step tuning, or a faster quantum step tuning. In quantum step tuning a large tuning step is made in one direction. When overshoot is detected, the direction is reversed but at a smaller tuning step. When overshoot is again detected, the direction is again reversed but at a still smaller tuning step size. This repetitive process can potentially reach the peak voltage or peak current condition in the smallest possible time. In an alternate embodiment, the sensing element may be implemented as a directional coupler, sensing the forward power and reflected power between the transmitter 204 and the antenna switch 208. When the antenna is in a matched condition, forward power is at a maximum and reflected power at a minimum. On the other hand, if the antenna is not matched, the reflected power begins to increase. Therefore, by measuring the forward power and reflected power, the sensing and tuning element can also automatically tune the antenna matching circuit and achieve optimum matching.

The sensing unit 236, either periodically upon command from the reader controller 202 or automatically based on a changing load at one of the antennas 112–120, may send data to the reader controller 202 to initiate a change of impedance from the antenna matching unit 232 for a specific one of the antennas 112–120. In this manner, as the number of tracked units (i.e., tagged merchandise) on a shelf or the type of tracked units change, the RFID reader 200 may substantially automatically retune one or more of its antennas 112–120 immediately.

The inventive RFID reader 200 thereby has the capability to accurately determine the number, identity, and location of multiple RFID tags placed on the shelf near one of the antennas 112–120.

Figure 3:
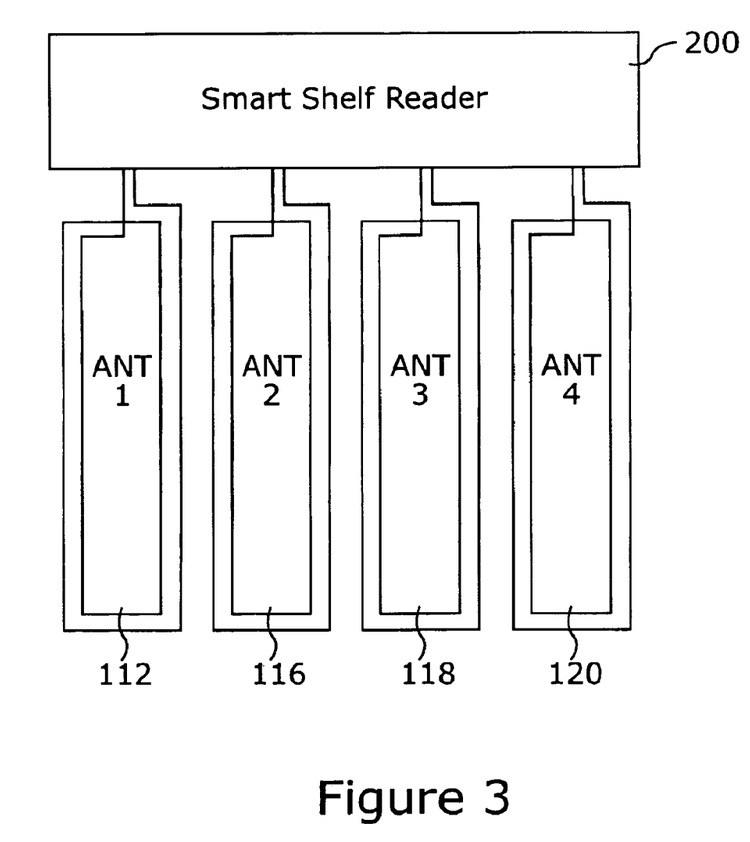
FIG. 3 is a schematic representation of an array of antennas suitable for use with the RFID readers of FIGS. 1 and 2 in a smart shelf system.

FIG. 3 is a schematic diagram showing four antennas 112 120 connected to the RFID reader 200. Antennas 112–120 are representative of dozens, or potentially hundreds, of antennas which may be selectively connected to the RFID reader 200 through the antenna switch 208 (FIG. 2). It will be recognized that switches could readily be stacked or banked using well known techniques to allow switching these large numbers of antennas. Since each antenna may be working with different merchandise and/or varying quantities of merchandise at any given time, each antenna may have different matching conditions. Therefore, the matching requirements for each antenna must be stored and when that specific antenna is activated, the specific antenna matching requirements for that antenna may be retrieved and applied.

It will be recognized that RFID systems may be constructed that, unlike the RFID system chosen for purposes of disclosure, use separate antennas for transmitting and receiving. It will also be recognized that these systems require slightly different configurations, primarily in the area of the antenna switch 208 and coupler 210. Modifications to the transmitter 204 and receiver 206 will probably be necessary as well. The concepts of the invention are not regarded limited to a system where a common transmit/receive antenna or antenna array is used.

While a smart shelf operating environment has been used for purposes of disclosure, it will be recognized that the inventive, self-calibrating, antenna switching RFID reader could be applied in other environments and services and the invention is not considered limited to the smart shelf application disclosed.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims:

1. An RFID reader, comprising:
   a) a controller;
   b) a transmitter for generating a transmitted RF signal operatively connected to said controller, said transmitter having an output;
   c) a receiver for receiving a received RF signal operatively coupled to said controller, said receiver having an input;
   d) a coupler operatively connected to said output of said transmitter and said input of said receiver;
   e) at least one antenna for alternately radiating said transmitted RF signal and receiving said received RF signal operatively connected to said coupler;
   f) means for sensing a loading condition of said at least one antenna and producing an output indicative of said loading condition; and
   g) means for selectively altering tuning of said at least one antenna operatively connected thereto and responsive to said output of said means for sensing.

2. The RFID reader as recited in claim 1, wherein at least one of said means for sensing and said means for selectively altering tuning is operatively connected to said controller.

3. The RFID reader as recited in claim 2, wherein at least one antenna comprises and array of antennas.

4. The RFID reader as recited in claim 3, further comprising:
   h) an antenna switch operatively connected to said controller, said coupler, and said array of antennas for selecting at least one antenna from said array of antennas and electrically connecting said selected at least one antenna to said coupler responsive to a command from said controller.

5. The RFID reader as recited in claim 4, wherein said array of antenna are disposed on at least one of the group: shelf, and other merchandise display fixture and said RFID reader forms part of a smart shelf system.

6. The RFID reader as recited in claim 4, wherein said means for altering antenna tuning comprises at least one from the group: a switched capacitor bank, a switched inductor bank, and a switched varactor bank.

7. The RFID reader as recited in claim 6, wherein said switched capacitor bank, said switched inductor bank, and said switched varactor bank are switched in response to a command from said controller.

8. The RFID reader as recited in claim 7, wherein altering antenna tuning comprises a tuning operation and said tuning operation is performed periodically.

9. The RFID reader as recited in claim 7, wherein altering antenna tuning comprises a tuning operation and said tuning operation is performed responsive to a sensed change in tuning of at least one of said array of antennas.

10. The RFID reader as recited in claim 1, wherein said transmitter further comprises a modulator and said transmitted signal may switched between a continuous wave (CW) RF signal and a selectively modulated RF signal upon commanded from said controller.

11. The RFID reader as recited in claim 10, wherein said selectively modulated RF signal comprises an amplitude modulated (AM) RF signal.

12. The RFID reader as recited in claim 1, further comprising means for arbitrating a data collision.

* * * * *